(12) United States Patent
Lee et al.

(10) Patent No.: US 6,888,891 B2
(45) Date of Patent: May 3, 2005

(54) WAVELET DOMAIN HALF-PIXEL MOTION COMPENSATION

(75) Inventors: Fredrick Chang-Ching Lee, Atherton, CA (US); Jonason Che-Cheng Chang, Taipei (TW)

(73) Assignee: Octa Technology, Inc., Atherton, CA (US)

(*) Notice: Subject to any disclaimer, the term of this patent is extended or adjusted under 35 U.S.C. 154(b) by 649 days.

(21) Appl. No.: 10/043,363

(22) Filed: Jan. 9, 2002

(65) Prior Publication Data
US 2003/0128760 A1 Jul. 10, 2003

(51) Int. Cl.$^7$ .................................................. H04N 7/12
(52) U.S. Cl. ................ 375/240.19; 382/281; 348/398.1
(58) Field of Search .................. 375/240.19, 240.17, 375/240.16; 382/281, 240, 246; 348/395.1, 398.1

(56) References Cited

U.S. PATENT DOCUMENTS

| | | | |
|---|---|---|---|
| 5,633,684 A | | 5/1997 | Teranishi et al. |
| 5,657,085 A | | 8/1997 | Katto |
| 5,815,602 A | * | 9/1998 | Ueda et al. .................. 382/236 |
| 5,949,912 A | * | 9/1999 | Wu ............................ 382/246 |
| 6,055,339 A | | 4/2000 | Wilkinson |
| 6,125,210 A | * | 9/2000 | Yang .......................... 382/240 |
| 6,272,253 B1 | | 8/2001 | Bannon et al. |

OTHER PUBLICATIONS

Mandal, M.K. et al., "Multiresolution Motion Estimation Techniques For Video Compression," Optical Engineering, vol. 35, No. 1, pp. 128–136 (Jan. 1996).

Meyer, Francois et al., "Motion Compensation of Wavelet Coefficients For Very Low Bit Rate Video Coding," Intl. Conference on Image Processing, ICIP'97, In Press, Santa Barbara (Oct. 1997).

Park, Hyun–Wook, "Motion Estimation Using Low–Band–Shift Method for Wavelet–Based Moving–Picture Coding, IEEE Transactions on Image Processing," vol. 9, No. 4, pp. 577–587 (Apr. 2000).

White, Richard L., "High Performance Compression of Astronomical Images," Proceedings of the NASA Space and Earth Science Data Compression Workshop (1992).

Yang, X. and Ramachandruan, K., "Hierarchical Backward Motion Compensation For Wavelet Video Coding Using Optimized Interpolation Filters," Proceedings International Conference on Image Processing, vol. 1, pp. 85–88 (Oct. 1997).

* cited by examiner

*Primary Examiner*—Gims Philippe
(74) *Attorney, Agent, or Firm*—David T. Millers

(57) ABSTRACT

A wavelet domain half-pixel motion compensation process that reduces aliasing effects that down sampling causes in the wavelet transform uses an H-transform and provides motion estimation and compensation in wavelet domain without requiring an inverse wavelet transform. For encoding, a q-dimensional (e.g., q=2) H-transform is applied in a conventional manner to non-overlapping qxq matrices in a first frame. When determining motion vectors for a second frame, "half-pixel" interpolation of the wavelet data of the first frame determines generates half-pixel data corresponding to qxq space-domain matrices that are offset (e.g., 1 pixel) horizontally and/or vertically from the qxq matrices that were transformed. Motion estimation techniques can then identify object motion by comparing wavelet domain object data in one frame to actual and interpolated wavelet domain data for another frame. Half-pixel interpolation or data generation can be combined with multi-resolution motion estimation in a high-performance wavelet video encoder.

24 Claims, 6 Drawing Sheets

| | h0^TOP | hx^TOP | | | hx1 | hxx12 | hx2 |
|---|---|---|---|---|---|---|---|
| Level MAXLEVEL | hy^TOP | hd^TOP | ... | | hxy13 | hxd14 | |
| | | | | | hx3 | | hx4 |
| ⋮ | | ⋮ | ⋱ | | | | |
| | hy1 | hyx12 | hy2 | | hd1 | hdx12 | hd2 |
| Level i | hyy13 | hyd14 | | | hdy13 | hdd14 | |
| | hy3 | | hy4 | | hd3 | | hd4 |

| | H0^TOP | Hx^TOP | | Hx | Hxx |
|---|---|---|---|---|---|
| Level MAXLEVEL | Hy^TOP | Hd^TOP | ... | | |
| ⋮ | ⋮ | | ⋱ | Hxy | Hxd |
| | Hy | Hyx | | Hd | Hdx |
| Level i | Hyy | Hyd | | Hdy | Hdd |

WAVELET DOMAIN HALF-PIXEL MOTION COMPENSATION

BACKGROUND

A wavelet transform decomposes a still image as a space-frequency domain structure that approximates the variations in the image and closely matches the human visual system that interprets the image. Consequently, wavelet compression techniques have achieved considerable success in the domain of still image compression. For example, the U.S. FBI fingerprint compression standard and the ISO still image compression standard JPEG2000 use wavelet compression techniques.

One type of wavelet transform is an H-transform, which is an extension of the Haar transform. Equation 1 shows a two-dimensional H transform matrix H, which in Equation 2, transforms a space domain, 2×2 matrix A having coefficients a00, a01, a10, and a11 into a wavelet domain matrix having coefficients h0, hx, hy, and hd. For image encoding, coefficients a00, a01, a10, and a11 are pixel values (e.g., color values, gray scale levels, or RGB or YUV color component values) having positions in matrix A according to the positions of corresponding pixels in the image. In the transformed matrix, the wavelet domain value h0 indicates the (low frequency) average spatial energy of matrix A, and wavelet domain values hx, hy, and hd respectively indicate (high frequency) horizontal, vertical, and diagonal variations in matrix A.

Equation 1:
$$H = \frac{1}{\sqrt{2}} \begin{pmatrix} 1 & 1 \\ 1 & -1 \end{pmatrix}$$

Equation 2:
$$H \cdot \begin{pmatrix} a00 & a01 \\ a10 & a11 \end{pmatrix} \cdot H^{-1} = \begin{pmatrix} h0 & hx \\ hy & hd \end{pmatrix}$$

Although the H-transform is fundamentally a two-dimensional matrix transform, Equation 3 expresses the H-transformation of pixel values to wavelet domain using a single matrix multiplication found by rearranging the pixel values a00, a10, a10, and a11 and wavelet domain values h0, hx, hy, and hd into four component vectors.

Equation 3:
$$h = \begin{pmatrix} h0 \\ hx \\ hy \\ hd \end{pmatrix} = \frac{1}{2} \begin{pmatrix} 1 & 1 & 1 & 1 \\ -1 & 1 & -1 & 1 \\ -1 & -1 & 1 & 1 \\ -1 & 1 & 1 & -1 \end{pmatrix} \cdot \begin{pmatrix} a00 \\ a01 \\ a10 \\ a11 \end{pmatrix}$$

One still image encoding method using the H-transform breaks an N×N matrix of pixel values representing an image into N/2×N/2 non-overlapped 2×2 matrices and then applies the two-dimensional H-transform to each 2×2 matrix of pixel values. The wavelet transform components for the entire N×N matrices can then be rearranged to construct an array 100 such as illustrated in FIG. 1. As shown, array 100 has low frequency components h0 arranged in an N/2×N/2 sub-array H0 according to spatial positions of the corresponding 2×2 space domain -matrices in the original N×N array. N/2×N/2 sub-arrays Hx, Hy, and Hd similarly contain respective high-frequency components hx, hy, and hd arranged in the respective N/2×N/2 sub-array Hx, Hy, and Hd according to spatial positions of corresponding 2×2 matrices in the original N×N array.

The H-transform can be applied to low frequency sub-array H0 in the same manner as the H-transform of the original image, and the resulting level-two transform components h0', hx', hy', and hd' can be arranged in N/4×N/4 sub-arrays H0', Hx', Hy', and Hd'. The process can be repeated one or more times to construct a multi-resolution pyramid data structure such as illustrated in FIG. 2. In encoding, transmitting, or storing a still image, a lossy compression can drop portions of one or more of the lower levels of the pyramid, and the amount of data/compression can be easily changed or adapted according to the available bandwidth or the desired resolution of the image.

Video (or moving image) encoding commonly uses motion estimation/compensation procedures that remove redundant information in frames having different time indices. In a system using wavelet transformations of frames of a video image, performing motion estimation directly on the image data in the wavelet domain would be desirable. However, relatively small movement of an object in video can cause significant changes in wavelet domain data, particularly the high frequency components.

FIG. 3 illustrates an example of an image including an object having a color "d" on a background color "e". An H-transform of a 2×2 matrix 310 corresponding to a portion of the object provides a low frequency component h0 having value 2d and high frequency component hx that is zero. If the object moves left one pixel in the next frame, an edge of the object is in a 2×2 matrix 320 that has the same relative position in the second frame as matrix 310 has in the first frame. An H-transform of matrix 320 provides a low frequency component h0 having value d+e and high frequency component hx that is e−d. Accordingly, when color e differs significantly from color d, a small movement of an object causes a large change in the wavelet domain data.

The rapid changes in wavelet domain data complicate motion estimation techniques in wavelet domain. Motion estimation can be performed in space domain, but transforming from space domain to wavelet domain for compression and back to space domain for motion estimation requires a series of inverse wavelet transforms corresponding to the levels of wavelet domain pyramid structure. The inverse wavelet transforms increase encoding complexity, making real-time encoding difficult for systems having low processing power. A video encoding system is thus desired that has low processing power requirements and uses efficient wavelet domain compression.

SUMMARY

In accordance with an aspect of the invention, a low complexity half-pixel interpolation process using the H-transform provides motion estimation and compensation in wavelet domain without requiring inverse wavelet transforms. For encoding, q-dimensional (e.g., q=2) H-transforms are applied in a conventional manner to non-overlapping q×q matrices in a first frame array to construct wavelet domain data structure representing the first frame. When determining motion vectors for a second frame, "half-pixel interpolation" of the wavelet data of the first frame generates half-pixel data corresponding to wavelet transforms of q×q matrices that are offset (e.g., by 1 pixel) horizontally and/or vertically from the standard set of q×q matrices. Motion estimation techniques can then identify an object in the second frame by comparing wavelet domain data for the second frame array to actual wavelet domain data and interpolated "half-pixel" wavelet domain data for the first frame.

One specific embodiment of the invention is an encoder including a wavelet transform unit, a half-pixel data generator, and a motion estimation unit. The wavelet transform unit converts video data from space domain to wavelet domain using conventional techniques to represent frames of video. The half-pixel data generator receives wavelet domain data from the wavelet transform unit and generates half-pixel data from the wavelet domain data. The half-pixel data approximates wavelet domain data that would result from a wavelet transform of matrices that are offset relative to matrices that the wavelet transform unit transforms. The half-pixel data generator can use formulas and methods described further below to generate the half-pixel data from the wavelet domain data without performing inverse wavelet transforms.

The motion estimation unit searches both the wavelet domain data and the half-pixel data for a block best matching an object block in a frame being coded. Accordingly, motion vectors for an object block in a frame being inter-coded can identify a best match that is a block of the wavelet domain data or a block of the half-pixel data.

Generally, the encoder further includes a quantization unit and a dequantization unit. The quantization unit quantizes the data for encoding of frames for transmission to a decoder. The dequantization unit dequantizes data output from the quantization unit and store results in memory or buffer for use in motion estimation for a subsequent frame. In particular, the half-pixel generator typically uses the wavelet domain data after quantization and dequantization so that the generated half-pixel data will be the same as half-pixel data that the decoder can generate.

Another embodiment of the invention is an encoding process for video. The encoding process includes performing a wavelet transformation on a first frame of video data to generate first wavelet domain data and generating half-pixel data from the first wavelet domain data. The half-pixel data approximates wavelet domain data that would result from a wavelet transform of matrices that are offset relative to matrices used during the wavelet transform. The encoding process can then search the wavelet domain data and the half-pixel data for a block that best matches an object block from wavelet domain data of a second frame. Accordingly, a data structure or stream representing the second frame can include a motion vector that identifies the block of wavelet domain data or half-pixel data that best matches the object block.

Still another embodiment of the invention is decoding process for video. The decoding process decodes a data structure or data stream to extract a wavelet domain difference array and motion vectors that are associated with a first frame of video. For each motion vector, the decoding process determines whether the motion vector is of a first type or a second type. Motion vectors of the first type identify respective blocks of the wavelet domain data representing a second frame. Motion vectors of the second type identify respective blocks of half-pixel data corresponding to an approximation of a wavelet transform of offset matrices representing portions of the second frame, the offset matrices being offset relative to matrices used in generating the wavelet domain data representing the second frame.

To construct wavelet domain data for the first frame, the decoding process adds the respective blocks of wavelet domain data identified by motion vectors of the first type to respective portions of the difference array. Additionally, for each motion vector of the second type, the decoding process uses the wavelet domain data representing the second frame in generating the block of half-pixel wavelet domain data identified by the motion vector of the second type and then adds the generated block to a portion of the difference array corresponding to the motion vector. An inverse wavelet transform of the constructed wavelet domain data for the first frame permits display of the first frame.

Yet another embodiment of the invention is a data structure representing video. In one embodiment the data structure includes first data indicating wavelet domain data for the first frame of the video, second data indicating a wavelet domain difference array for a second frame of the video, and motion vectors of first and second types. The motion vectors of the first type correspond to respective blocks in the difference array and identify blocks of the wavelet domain data of the first frame for addition to the respective blocks in the difference array. The motion vectors of the second type correspond to respective blocks in the difference array and identify blocks of half-pixel data for addition to the respective blocks in the difference array, where the half-pixel data approximates wavelet transforms of arrays in the first frame that are offset relative to arrays from the first frame that were used in generating the wavelet domain data for the first frame.

BRIEF DESCRIPTION OF THE DRAWINGS

FIGS. 7A and 7B illustrate multi-resolution data structures including wavelet domain half-pixel image data in accordance with an embodiment of the invention.

Use of the same reference symbols in different figures indicates similar or identical items.

DETAILED DESCRIPTION

In accordance with an aspect of the invention, a motion estimation process for video encoding generates "half-pixel" wavelet domain data from wavelet domain image data that a wavelet transform determined. The half-pixel data approximates the results of a wavelet transform of space domain or low frequency matrices that are offset horizontally, vertically, or diagonally from the matrices used in the wavelet transform. The approximated half-pixel data is determined without needing an inverse wavelet transform and re-transform of wavelet data during motion estimation and is suitable for devices and applications having low available processing power. Motion estimation procedures that determine motion vectors indicating the motion of objects in video can compare wavelet domain object blocks from one frame to the wavelet domain data and half-pixel data of another frame.

Figure 4:
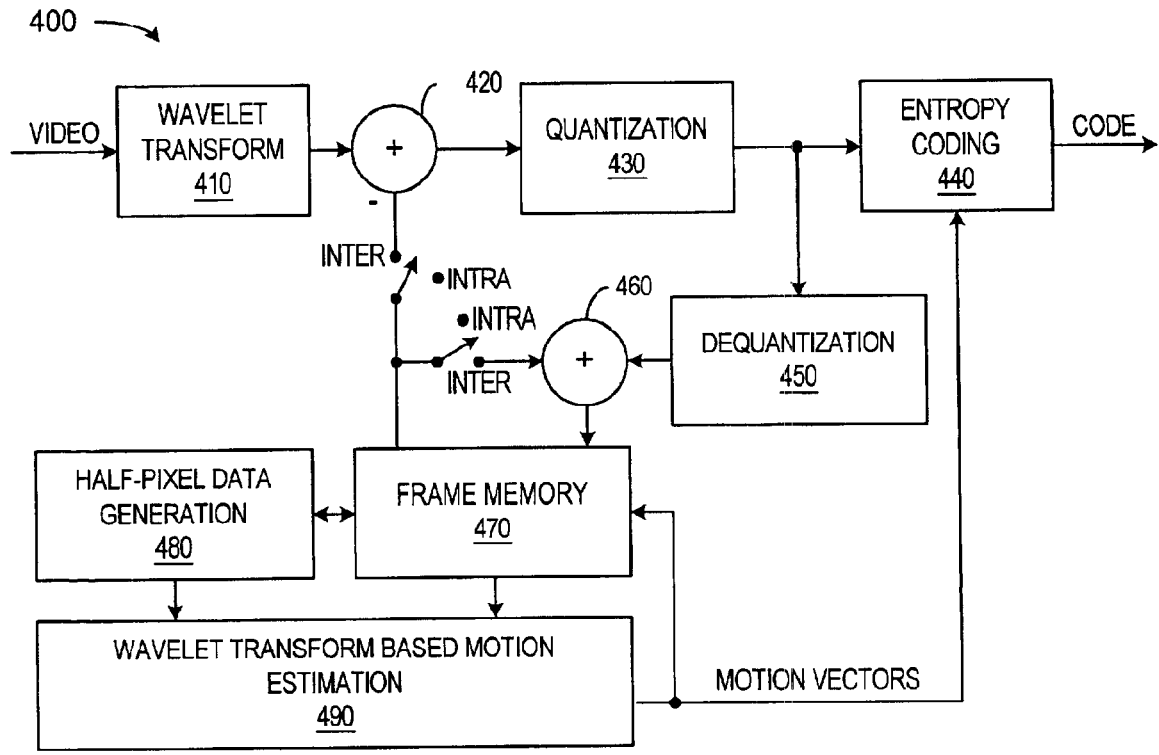
FIG. 4 is a block diagram of an encoding system using wavelet domain half-pixel interpolation in accordance with an embodiment of the invention.

FIG. 4 is a block diagram of a video encoder 400 in accordance with an embodiment of the invention. Video encoder 400 includes a wavelet transformation unit 410, a quantization unit 430, an entropy encoding unit 440, a dequantization unit 450, a half-pixel data generator 480, and a motion estimation unit 490. Generally, the functional blocks of video encoder 400 can be implemented using specialized hardware, software, or a combination of hardware and software to perform the encoding functions described herein.

Figure 1:
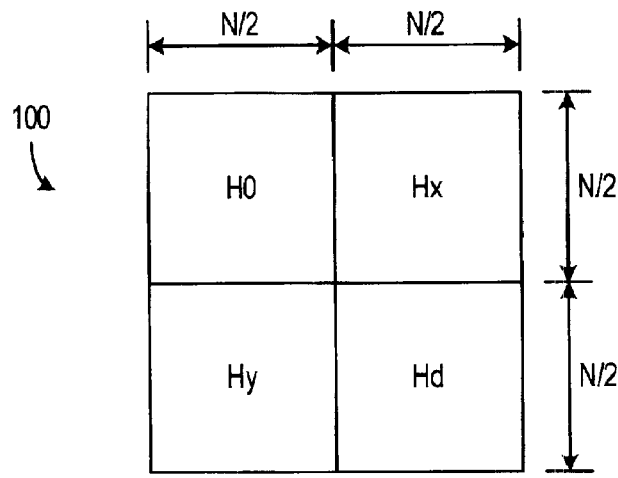
FIG. 1 illustrates a data structure resulting from a wavelet transform of a still image.
Figure 2:
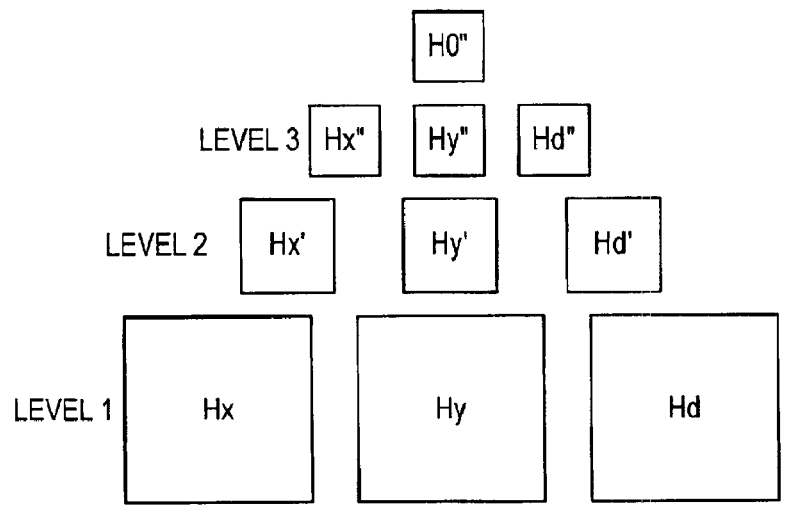
FIG. 2 illustrates a multi-resolution data structure resulting from applying a series of wavelet transforms to a still image data.
Figure 3:
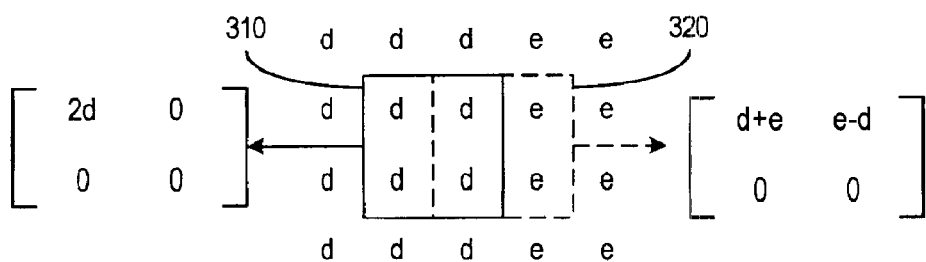
FIG. 3 illustrates the effect that small motion of an object can have on wavelet domain data.

In operation wavelet transform unit 410, receives video image data as a series of space domain arrays representing a series of frames that form the video image. Wavelet transform unit 410 transforms each space domain array into wavelet domain data structure. In particular, wavelet transform unit 410 partitions each space domain array into a set of non-overlapping q×q matrices and performs a wavelet domain transform on each q×q matrix. In an exemplary embodiment of the invention, q is equal to two, and the wavelet transform of a space domain or low frequency array is the two-dimensional H-transform of Equations 1, 2, and 3. The low frequency wavelet domain data can then be collected into a low frequency component array that is transformed in the same manner as the space domain array. Wavelet transform unit 410 constructs a pyramid data structure such as illustrated in FIG. 2 by iteratively constructing low frequency arrays and applying the wavelet transforms to the constructed arrays. Generally, the number of levels in the pyramid data structure can be limited as desired, including being limited to only a single level.

The two-dimensional H-transform such as described above has several merits for use in a fast, low-complexity encoder. In particular, transforming non-overlapped q×q pixel blocks simplifies implementation of a parallel processing architecture in encoder 400, and the H-transform has a small kernel, allowing eight integer additions/subtractions to complete the transform of spatial or low frequency components a00, a01, a10, and a11 into wavelet domain values h0, hx, hy, and hd. Additionally, the two-dimensional wavelet transform, unlike one-dimensional transforms that are extended to two dimensions by transforming first along rows and then along columns, avoids the problem of leaving behind more high frequency contributions in the horizontal direction and low frequency components in the vertical direction.

After a frame being encoded passes through wavelet transform unit 410, all encoding processes in encoder 400 are performed in wavelet domain. For intra frames, which are encoded without using motion estimation, quantization unit 430 quantizes the wavelet domain data from wavelet transform unit 420 and entropy coding unit 440 applies an encoding method such as Huffman encoding to the quantized wavelet data representing the intra frame. The encoded image data can then be transmitted or stored depending on application of video encoder 400.

Dequantizer 450 undoes the quantization of the data from quantization unit 430, as would a decoder receiving data from encoder 400. Dequantizer 450 stores the resulting wavelet domain data in a frame memory 470 for subsequent encoding of an inter frame.

Inter frames are encoded as differences between the wavelet domain frame data from wavelet transform 410 and similar wavelet domain frame data constructed using motion vectors and the stored wavelet domain data and half-pixel data for other frames. In particular, an adder 420 subtracts the constructed frame data from wavelet domain data that wavelet transform unit 410 and outputs to quantization unit 430 a difference for encoding of the inter frame. Generally, the difference data will include a difference array for each array or sub-array of wavelet domain data in the pyramid structure illustrated in FIG. 2.

For inter frames, dequantization unit 450 dequantizes the difference data, and an adder 460 adds back the similar frame data that was constructed from motion vectors and wavelet domain data or half-pixel data previously stored in frame memory 470. The resulting wavelet domain frame data is stored in frame memory 470 for motion estimation process that may be required for other inter frames.

Quantization unit 430 quantizes and entropy coding unit 440 encodes the resulting difference frame data. Entropy coding unit 440 also encodes motion vectors for the inter frame as part of the output data CODE.

Figure 5:
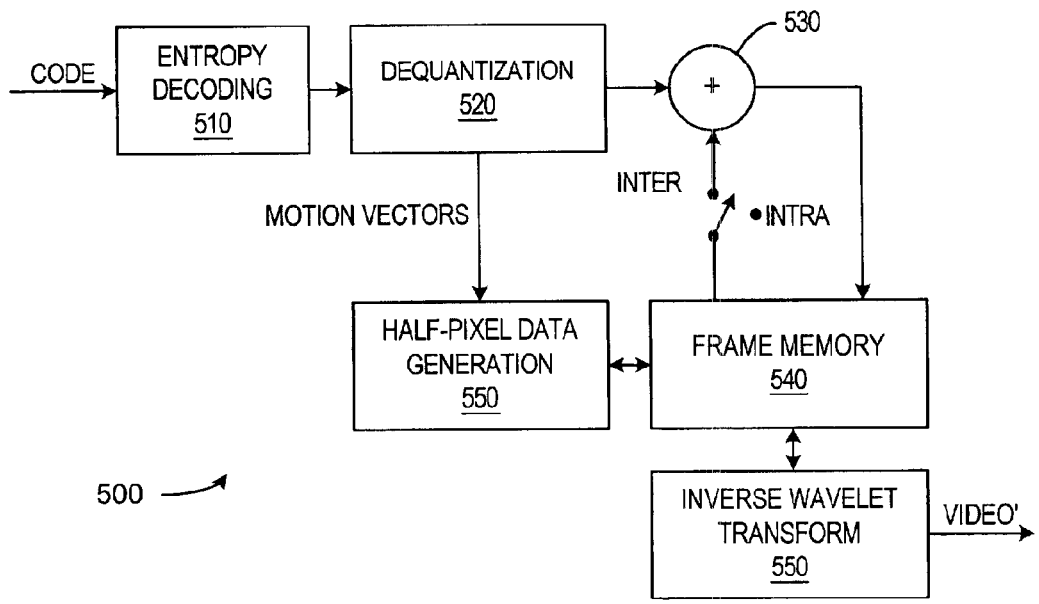
FIG. 5 is a block diagram of a decoding system using wavelet domain half-pixel interpolation in accordance with an embodiment of the invention.

FIG. 5 is a block diagram of a decoder 500 capable of decoding output data CODE. Decoder 500 includes an entropy decoding unit 510 and a dequantization unit 520 that undo the quantization and entropy coding to generate wavelet domain data for intra frames or a difference data and motion vectors for inter frames. The wavelet domain data for an intra frame can be directly stored in a frame memory 540. An inverse wavelet transform unit 550 converts the wavelet domain data to space domain data VIDEO representing a frame of video for display or other use.

For inter frames, an adder 530 adds to difference arrays blocks of wavelet domain data or half-pixel data from frame memory 540 that the motion vectors identify for the current frame. Accordingly, when a motion vector identifies a block of half-pixel data, a half-pixel data generator 550 uses the same techniques as half-pixel data generator 480 in encoder 400 to generate the required block of half-pixel data from the wavelet domain data in frame memory 540.

Figure 6A:
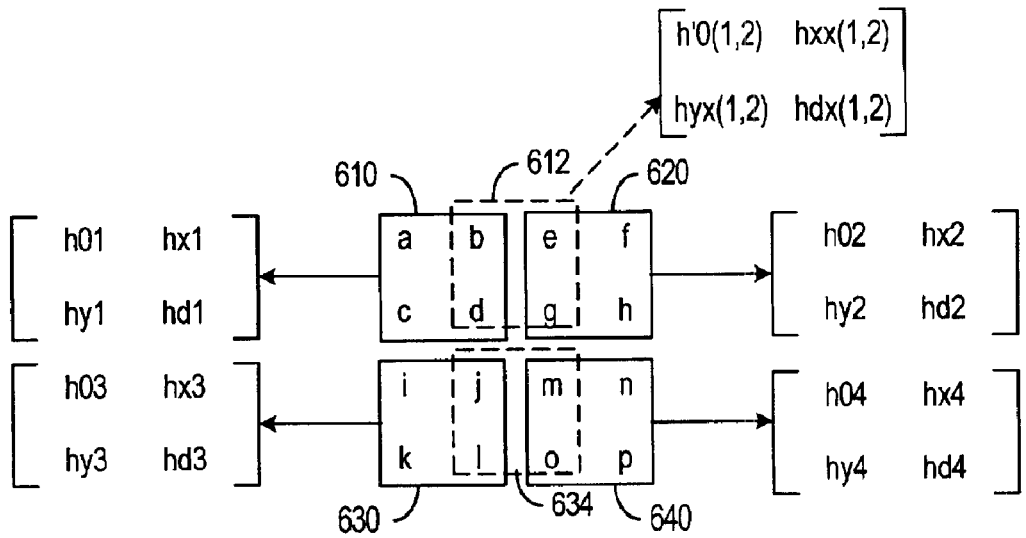
FIGS. 6A, 6B, and 6C illustrate matrices that are respectively offset horizontally, vertically, and diagonally from a standard partition of space domain or low frequency image data and associated half-pixel data in accordance with an embodiment of the invention.
Figure 6B:
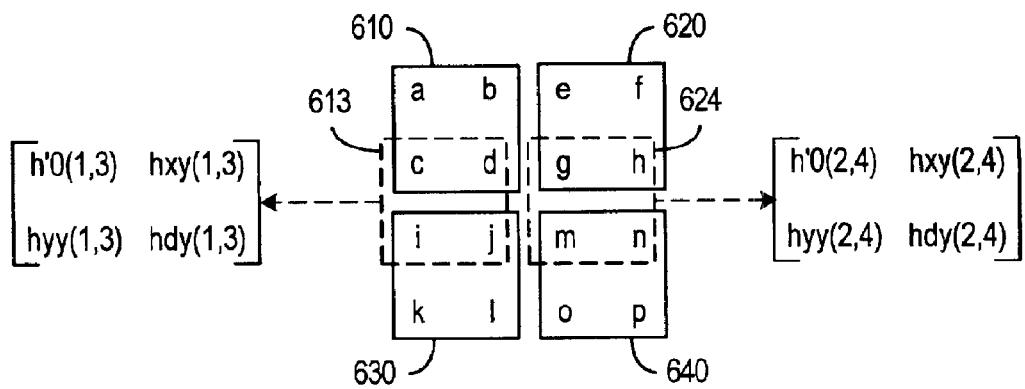
Figure 6C:
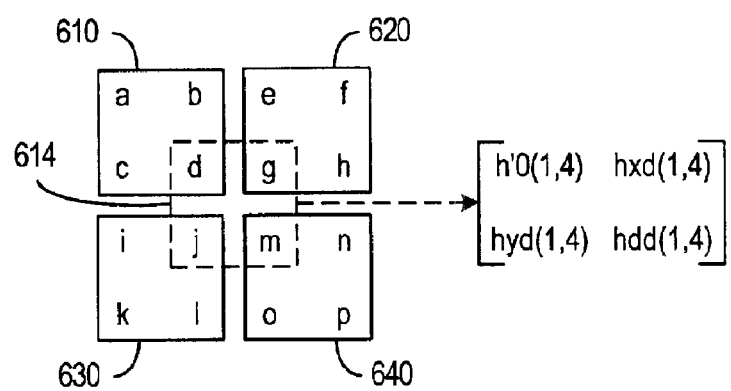

In accordance with an aspect of the invention, wavelet domain half-pixel data generators 480 and 550 generate half-pixel data corresponding to and approximating wavelet transforms of q×q matrices of space domain pixel values or low frequency wavelet domain coefficients that wavelet transform unit 410 did not use. In particular, FIGS. 6A, 6B, and 6C illustrate an array of sixteen pixel values or low frequency components a to p, which are partitioned into four 2×2 arrays 610, 620, 630, and 640 for wavelet transforms. In the exemplary embodiment, wavelet transform unit 410 performs a two-dimensional H-transform of arrays 610, 620, 630, and 640 to generate four sets of wavelet domain coefficients {h01, hx1, hy1, hd1}, {h02, hx2, hy2, hd2}, {h03, hx3, hy3, hd3}, and {h04, hx4, hy4, hd4}, respectively.

FIGS. 6A, 6B, and 6C also show arrays 612, 634, 613, 624, and 614 that are offset relative to the arrays 610, 620, 630, and 640 that wavelet transform unit 410 transforms. In particular, array 612 (or 634) is horizontally offset one pixel from arrays 610 and 620 (or 630 and 640). Array 613 (or 624) is vertically offset one pixel from arrays 610 and 630 (or 620 and 640), and array 614 is diagonally offset one pixel from each of arrays 610, 620, 630, and 640.

Wavelet transform unit 410 does not determine wavelet transforms of offset arrays 612, 634, 613, 624, and 614 because those transforms are not required for representation of a frame, i.e., the transforms are skipped for down sampling. The wavelet domain transforms of arrays 612, 634, 613, 624, and 614 could be exactly determined from pixel values a to p or from the wavelet domain coefficients {h01, hx1, hy1, hd1}, {h02, hx2, hy2, hd2}, {h03, hx3, hy3, hd3}, and {h04, hx4, hy4, hd4}, but determination of the pixel values a to p or low frequency wavelet domain components h01, h02, h03, and h04 from a wavelet domain pyramid structure generally requires a series of inverse wavelet transforms. At each level of the multi-resolution structure, the high frequency components are available, but the low frequency components are only available for the top level of the multi-resolution structure.

As noted above, a low processing power encoding or decoding process seeks to avoid the inverse wavelet transforms even though wavelet domain coefficients for an offset array 612, 634, 613, 624, or 614 can differ greatly from the wavelet domain coefficients of arrays 610, 620, 630, and 640. To avoid the inverse wavelet transforms, half-pixel data generator 480 uses approximations of the unavailable low frequency components h01, h02, h03, and h04 when generating half-pixel data that approximates the wavelet transforms of arrays 612, 634, 613, 624, and 614 and other offset arrays in the subband. Additionally, wavelet domain half-pixel data generator 480 constructs approximations of wavelet transforms of similar arrays in the other levels of the pyramid wavelet domain data structure to permit half-pixel motion estimation of every subband within all levels of the pyramid structure.

Equations 4 generally outline a technique for obtaining formula for obtaining the half-pixel data associated with the offset arrays.

Equations 4:

$$h0' = \frac{h0^{TOP}}{2^{MAXLEVEL-i}}$$

$$h' = \begin{bmatrix} h0' \\ hx \\ hy \\ hd \end{bmatrix}$$

$$A' = H^{-1} \cdot h'$$

$$h_t = H \cdot A'_t = H \cdot (H^{-1} \cdot h')_t$$

In Equations 4, hx, hy, and hd are the actual high frequency wavelet domain components, and h0' is an approximation of the actual low frequency component h0 for a 2×2 array. An average of local low frequency wavelet coefficients such as provided by the corresponding low frequency component of the top level of the pyramid data structure typically represents a reasonable approximation of the actual low frequency coefficient h0, but other approximations of h0 could be used. Array h' represents the wavelet domain coefficients with the above approximation of the low frequency component, and applying an inverse H-transform to h' yields an approximate matrix A' of space domain pixel values or low frequency coefficients. Substituting a shifted or offset array A'$_t$ and applying an H-transform to the shifted array A'$_t$ provides a wavelet domain array h'$_t$ approximating actual wavelet domain coefficients h0, hx, hy, and hd. Performing the mathematical operations indicated in Equations 4 provides formulae for the half-pixel wavelet domain data (e.g., for arrays 612, 634, 613, 624, and 614) in terms of the wavelet domain coefficients of overlapping arrays (e.g., arrays 610, 620, 630, and 640) and the top-level low frequency components of the wavelet domain pyramid data structure.

For horizontally offset arrays such as arrays 612 and 634 of FIG. 6A, half-pixel data generator 480 generates half-pixel coefficients h0'(r,s), hxx(r,s), hyx(r,s), and hdx(r,s) using Equations 5.

Equations 5:

$$h0'(r, s) = \frac{h0(r, s)^{TOP}}{2^{MAXLEVEL-i}}$$

$$hxx(r, s) = (h0's - hxs - h0'r - hxr)/2$$

$$hyx(r, s) = (hys - hds + hyr + hxr)/2$$

$$hdx(r, s) = (hys - hds - hyr - hdr)/2$$

In Equations 5, i is the level of the multi-resolution wavelet domain data structure that contains the horizontally offset arrays of interest; r and s are indices identifying arrays that are horizontally offset by one coefficient from the desired offset array; hxr, hyr, and hdr are wavelet domain coefficients and h0'r is an approximate low frequency wavelet domain coefficient corresponding to left array r; hxs, hys, and hds are wavelet domain coefficients and h0s is an approximate low frequency wavelet domain coefficient corresponding to right array s; and h0(r, S)$^{TOP}$ is the low frequency wavelet domain coefficient or average of low frequency wavelet domain coefficients from the top level (MAXLEVEL) of the multi-resolution data structure and corresponding to an array containing arrays r and s. Equations 5 for hyx(r,s) and hdx(r,s) do not use approximation h0's or h0'r and are exact.

For vertically offset arrays such as arrays 613 and 624 of FIG. 6B, half-pixel data generator 480 generates half-pixel coefficients h0'(r,s), hxy(r,s), hyy(r,s), and hdy(r,s) using Equations 6.

Equations 6:

$$h0'(r, s) = \frac{h0(r, s)^{TOP}}{2^{MAXLEVEL-i}}$$

$$hxy(r, s) = (hxs - hds + hxr + hdr)/2$$

$$hyy(r, s) = (h0's - hys - h0'r - hyr)/2$$

$$hdy(r, s) = (hxs - hds - hxr - hdr)/2$$

In Equations 6, i is the level of the multi-resolution wavelet domain data structure that contains the vertically offset array of interest; r and s are indices identifying arrays that are vertically offset by one pixel from the offset array; hxr, hyr, and hdr are wavelet domain coefficients and h0'r is an approximate low frequency wavelet domain coefficient corresponding to top array r; hxs, hys, and hds are wavelet domain coefficients and h0's is an approximate low frequency wavelet domain coefficient corresponding to bottom array s; and h0(r,s)$^{TOP}$ is the low frequency wavelet domain coefficient or average that is from the top level (level MAXLEVEL) of the multi-resolution data structure and corresponds to an array containing arrays r and s. Equations 6 for hxy(r,s) and hdy(r,s) do not use approximation h0's or h0'r and are exact.

For diagonally offset array such as array 614 of FIG. 6C, half-pixel data generator generates half-pixel coefficients h0'(r,s), hxd(r,s), hyd(r,s), and hdd(r,s) using Equations 7.

Equations 7:

$$h0'(r, u) = \frac{h0(r, u)^{TOP}}{2^{MAXLEVEL-i}}$$
$$d' = (h0'r + hxr + hyr + hdr)/2$$
$$g' = (h0's - hxs + hys - hds)/2$$
$$j' = (h0't + hxt - hyt - hdt)/2$$
$$m' = (h0'u - hxu - hyu + hdu)/2$$
$$hxd(r, u) = (m' - j' + g' - d')/4$$
$$hyd(r, u) = (m' + j' - g' - d')/4$$
$$hdd(r, u) = (m' - j' - g' + d')/4$$

In Equations 7, i is the level of the multi-resolution wavelet domain data structure that contains the diagonaly offset array of interest; r, s, t, and u are indices identifying arrays that are diagonally offset by one pixel from the offset array; hxr, hyr, and hdr are wavelet domain coefficients and h0'r is an approximate low frequency wavelet domain coefficient corresponding to top-left array s; hxs, hys, and hds are wavelet domain coefficients and h0's is an approximate low frequency wavelet domain coefficient corresponding to top-right array s; hxt, hyt, and hdt are wavelet domain coefficients and h0't is an approximate low frequency wavelet domain coefficient corresponding to bottom-left array t; hxu, hyu, and hdu are wavelet domain coefficients and h0'u is an approximate low frequency wavelet domain coefficient corresponding to bottom-right array u; and $h0(r,u)^{TOP}$ is the low frequency wavelet domain coefficient or average that is from the top level (level MAXLEVEL) of the multi-resolution data structure and corresponds to an array containing arrays r to u.

In encoder 400 of FIG. 4, frame memory 470 contains the wavelet domain data (e.g., pyramid structure) for a prior frame that was encoded, quantized, dequantized, and decoded. For inter coding of the next frame, half-pixel data generator 480 uses the wavelet domain data for the prior frame in memory 470 to generate the half-pixel data. In particular, half-pixel data generator 480 can generate half-pixel wavelet domain data for each level i of the pyramid data structure using Equations 5, 6, and 7.

The resulting wavelet domain data and half-pixel wavelet domain data from generator 480 can be combined into a multi-resolution data structure 700 illustrated in FIG. 7A. Each level of multi-resolution data structure 700 the sub-band arrays Hx, Hy, and Hd are augmented to include not only the collection of respective wavelet domain coefficients hx, hy, and hd but also approximate half-pixel wavelet domain coefficients (hxx, hxy, hxd), (hyx, hyy, hyd), and (hdx, hdy, and hdd), which fit between the wavelet domain coefficients hx, hy, and hd. The top level of the pyramid structure additionally includes the low frequency coefficients $h0^{TOP}$ and half-pixel low frequency coefficients $hx_{TOP}$, $hy_{TOP}$, and $hd^{TOP}$, which can be exactly calculated for the top level.

FIG. 7B shows an alternative organization of the wavelet domain data and half-pixel wavelet domain data in a multi-resolution data structure 750. Data structure 750 has twelve sub-arrays Hx, Hy, Hd, Hxx, Hyx, Hdx, Hxy, Hyy, Hdy, Hxd, Hyd, and Hdd per level below the top level. Sub-arrays Hx, Hy, and Hd respectively contain wavelet domain coefficients hx, hy, and hd arranged according to corresponding positions of underlying pixel values. Sub-arrays Hxx, Hyx, Hdx, Hxy, Hyy, Hdy, Hxd, Hyd, and Hdd respectively contain half-pixel wavelet domain coefficients hxx, hyx, hdx, hxy, hyy, hdy, hxd, hyd, and hdd arranged according to positions of underlying pixel values. Multi-resolution data structure 750 can simplify comparisons of an object block in the same level of another frame to blocks of wavelet domain data because the object block can be directly compared to blocks in sub-arrays Hx, Hy, Hd, Hxx, Hyx, Hdx, Hxy, Hyy, Hdy, Hxd, Hyd, and Hdd.

Motion estimation unit 490 of FIG. 4 searches the wavelet domain data and the half-pixel data for a previous frame when searching for a best match for a portion of an inter frame being encoded. Use of the half-pixel wavelet data effectively expands the number of vectors in a codebook for matching with blocks of the wavelet domain data of the inter frame and accordingly can improve the compression ratio and image quality achieved during encoding.

Figure 8:
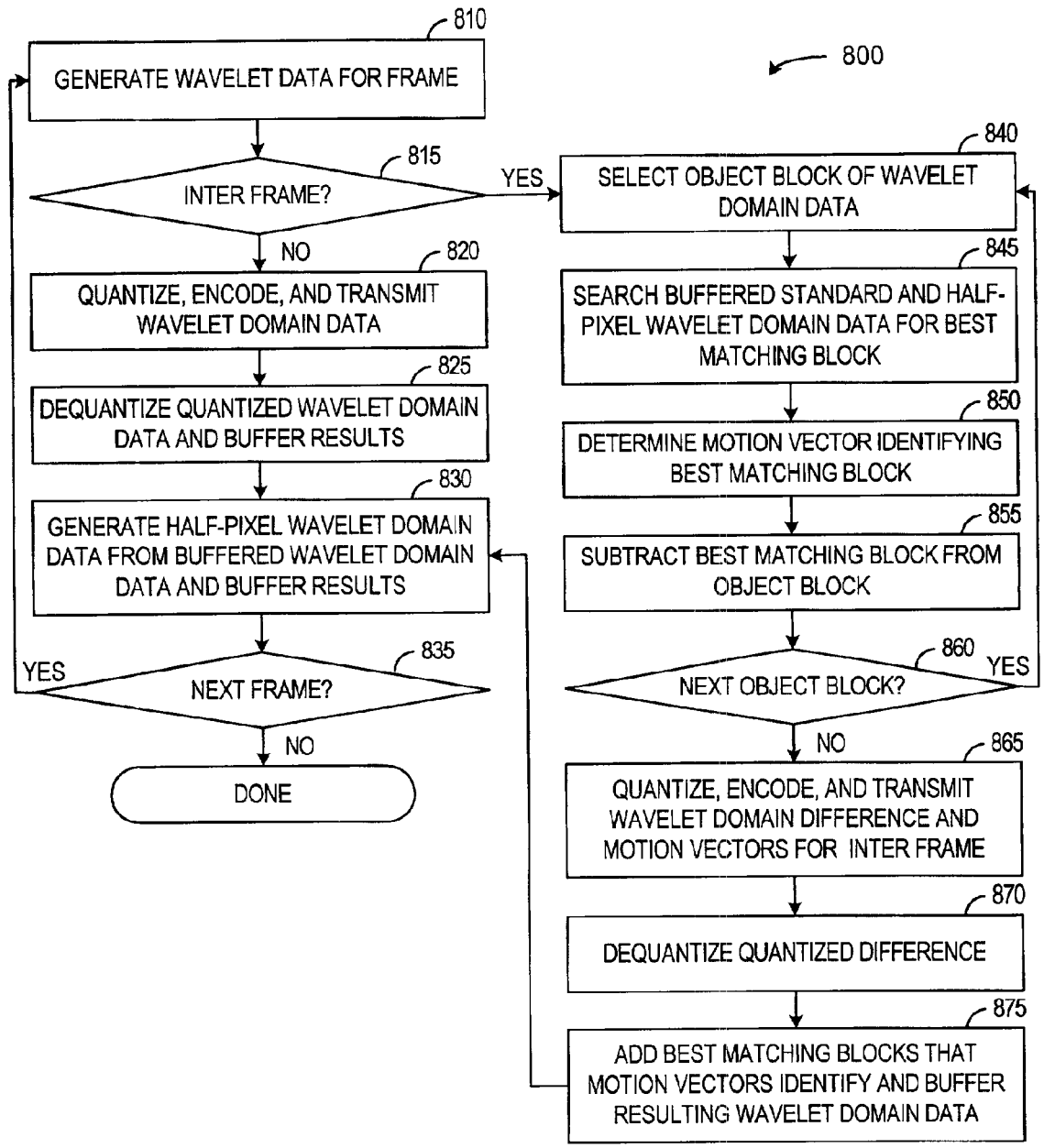
FIG. 8 is a flow diagram of an encoding process in accordance with an embodiment of the invention.

FIG. 8 is a flow diagram of a video encoding process 800 in accordance with an embodiment of the invention implemented in encoder 400 (FIG. 4). Encoding process 800 begins in step 810 with wavelet transform unit 410 generating wavelet domain data for a frame of a video image. Step 815 then determines whether the frame is an intra frame, which is encoded without motion estimation, or an inter frame, which requires motion estimation. Alternatively, selection of whether the frame is intra or inter encoded can be made after determining the amount of compression that motion estimation achieves. In particular, if motion estimation indicates that the frame differs significantly from a preceding frame, the frame can be selected for intra encoding.

For an intra frame, quantization unit 430 and entropy coding unit 440 quantize, encode, and transmit the wavelet domain data for the frame. In step 825, dequantization unit 450 dequantizes the quantized wavelet data for possible use for motion estimation of other frames. Frame buffer 470 stores the dequantized wavelet data output from dequantization unit 450.

In step 830 of process 800, half-pixel data generator 480 generates half-pixel data from the buffered wavelet domain data in frame memory 470. Step 830 generates the half-pixel data in anticipation of a subsequent frame being inter coded, but in some cases, the half-pixel data may not be required. To reduce processing power requirements, an alternative encoding process generates the half-pixel data only during inter coding of a frame that requires the motion estimation.

After generation of the half-pixel wavelet domain information in step 830, process 800 branches back to step 810 if a step 835 identifies another frame for encoding.

If the frame being encoded is an inter frame, process 800 branches from step 815 to a step 840 where motion estimation unit 490 selects an object block in the frame. The object block can be a block of wavelet domain coefficients in a particular level of the wavelet domain pyramid data structure. A variety of object block selection processes could be employed. For example, each object block can have an irregular size selected according to contents of the blocks. Alternatively, the blocks can have a fixed size (e.g., a 16×16 array) or a size selected according to the level in the pyramid structure of the object block.

Once the object block has been selected, motion estimation unit 490 searches the wavelet domain data and the half-pixel data in the same level of the prior frame to identify a best matching block. Motion estimation unit 490 then generates a motion vector corresponding to the best matching block. Each motion vector can include an additional bit that is set or not to indicate whether the motion vector identifies wavelet domain data or half-pixel data. The motion vector can thus identify either a block of wavelet domain data or a block of half-pixel data. In step 855, the best matching block is subtracted from the object block to generate a difference block, which becomes part of difference data representing the frame being encoded. Step 860 then determines whether another object block can be selected.

Motion estimation unit 490 repeats steps 840 through 860 for each level of the multi-resolution structure until no object blocks remain to be selected, and the collection of difference blocks form wavelet domain difference data for the frame. In step 865, quantization unit 430 and entropy coding unit 440 quantize, encode, and transmit the wavelet domain difference data and the associated motion vectors.

In steps 870 and 875, dequantization unit 450 dequantizes the difference data, and adder 460 adds back the best matching blocks that the motion vectors identify. As a result, encoding process 800 reconstructs the wavelet domain data (with changes possibly introduced in the quantization, encoding, decoding, or dequantization), and process 800 then returns to step 830 to generate half-pixel data for possible use in motion estimation for the next fame.

Figure 9:
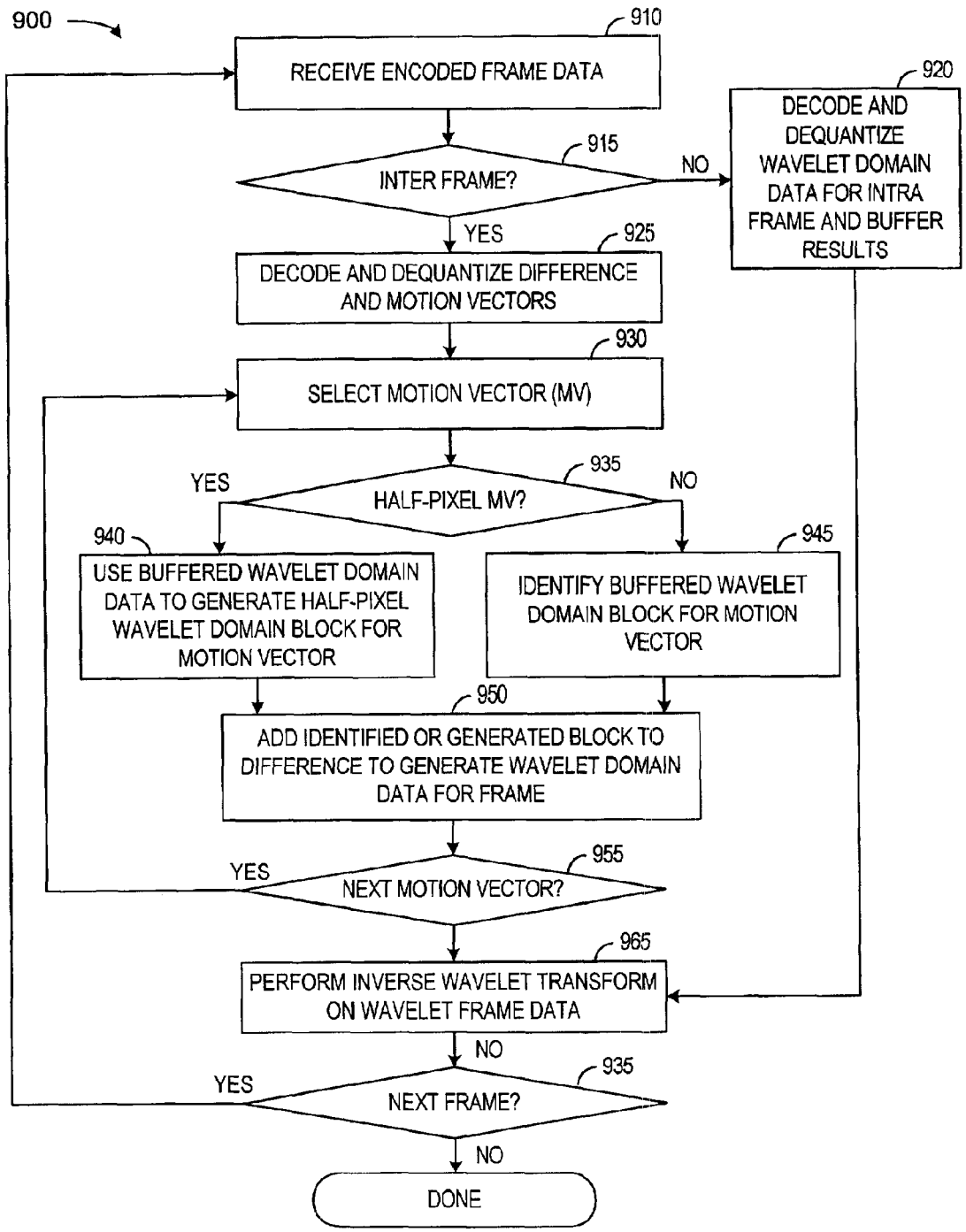
FIG. 9 is a flow diagram of a decoding process in accordance with an embodiment of the invention.

Since the motion estimation process uses motion vectors that can identify half-pixel data, a decoding process may require some half-pixel wavelet domain image data. FIG. 9 is a flow diagram of a decoding process 900 in accordance with an embodiment of the invention.

Decoding process 900 begins in step 910 with decoder 500 receiving encoded frame data. In step 915, decoder 500 determines whether the frame data corresponds to an inter frame or an intra frame. Data for an intra frame does not include motion vectors and does not require half-pixel data for decoding. Accordingly, intra frames can be decoded using conventional techniques. In particular, step 920 decodes and dequantizes the wavelet domain data representing an intra frame, which step 965 can perform an inverse wavelet transform on to reconstruct pixel information. Before the inverse transformation, step 920 buffers the wavelet domain data for possible subsequent use in decoding inter frames.

If step 915 determines that a received frame data corresponds to an inter frame, process 900 branches from step 915 to step 925, which decodes and dequantizes the difference data and the motion vectors associated with the inter frame. Step 930 then selects one of the motion vectors for a process that reconstructs wavelet domain data for the inter frame from the difference data and buffered wavelet domain data for a previous frame.

Following step 930, step 935 determines whether the selected motion vector corresponds to a matching block of wavelet domain data or half-pixel data. If the motion vector corresponds to a block of wavelet domain data, step 945 identifies and uses the block of wavelet domain data from the wavelet domain data buffered for previous frames.

If the motion vector corresponds to a block of half-pixel data, step 940 generates the block of half-pixel data from the wavelet domain data buffered for previous frames. In particular, step 940 can use Equations 5, 6, and 7 as described above to generate the required block half-pixel data. For decoding, generation of all half-pixel data is not required, and to reduce processing power requirements, only the blocks of half-pixel data identified by motion vectors are generated. Alternatively, the decoder can determine all of the half-pixel wavelet domain data before motion vectors identify particular blocks.

Step 950 adds the identified or generated block of wavelet domain data or half-pixel data to a block that is in the difference array and corresponds to the motion vector. Steps 930 to 955 are repeated once for each motion vector so that the additions in step 950 reconstruct the wavelet domain data for the inter frame being decoded. The newly decoded wavelet domain data is buffered for possible use in decoding a subsequent inter frame before step 965 performs the inverse wavelet transform to reconstruct the pixel data required for displaying of the frame.

As described above, an encoder having a relatively small amount of processing power can generate half-pixel data from wavelet domain data. The half-pixel data can be included in motion estimation searches and effectively expands the codebook of possible matching blocks. This expansion improves compression by providing more effective removal of redundant information in a video signal.

Although the invention has been described with reference to particular embodiments, the description is only an example of the invention's application and should not be taken as a limitation. For example, although the description emphasizes motion estimation based on a prior source frame to a subsequent target frame, other motion estimation procedures using a source frame that follows the target frame or multiple source frames are also suitable for use in the embodiments of the invention. Additionally, principles of the invention described above can be applied more generally to wavelet transforms of other types and dimensions. Various other adaptations and combinations of features of the embodiments disclosed are within the scope of the invention as defined by the following claims.

What is claimed is:

1. An encoder comprising:
   a wavelet transform unit operable to convert video data from space domain to wavelet domain;
   a half-pixel data generator coupled to receive wavelet domain data from the wavelet transform unit, wherein the half-pixel data generator generates half-pixel data from the wavelet domain data, the half-pixel data approximating wavelet domain data resulting from a wavelet transform of matrices that are offset relative to matrices that the wavelet transform unit transforms; and
   a motion estimation unit operable to search the wavelet domain data and the half-pixel data for a block best matching an object block in a frame being coded.

2. The encoder of claim 1, wherein the half-pixel data generator generates the half-pixel data from the wavelet domain data without performing an inverse wavelet transform.

3. The encoder of claim 1, further comprising:
   a quantization unit coupled to quantize the wavelet domain data for encoding of intra frames;
   a memory; and
   a dequantization unit coupled to dequantize data output from the quantization unit and store results in the memory for use in motion estimation for a subsequent frame.

4. The encoder of claim 1, wherein the wavelet transform is a two-dimensional H-transform.

5. The encoder of claim 1, wherein the half-pixel generator generates the half-pixel data for a level of a multi-resolution data structure using high frequency wavelet domain data for the level and an approximation of low frequency wavelet domain data for the level.

6. The encoder of claim 5, wherein the approximation of the low frequency wavelet domain data for the level is determined from low frequency wavelet domain data from a higher level of the multi-resolution data structure.

7. The encoder of claim 5, wherein the higher level of the multi-resolution data structure is a top level of the multi-resolution data structure.

8. The encoder of claim 1, wherein for an offset matrix that is horizontally offset from matrices corresponding to the wavelet domain data, the encoder determines half-pixel data including half pixel coefficients hxx(r,s), hyx(r,s), and hdx(r,s) using the following equations:

$$hxx(r,s)=(h0's-hxs-h0'r-hxr)/2;$$

$$hyx(r,s)=(hys-hds+hyr+hxr)/2; \text{ and}$$

$$hdx(r,s)=(hys-hds-hyr-hdr)/2, \text{ wherein:}$$

r and s are indices identifying arrays that are horizontally offset by one coefficient from the offset matrix;

hxr, hyr, and hdr are wavelet domain coefficients and h0'r is an approximate low frequency wavelet domain coefficient corresponding to r; and hxs, hys, and hds are wavelet domain coefficients and h0s is an approximate low frequency wavelet domain coefficient corresponding to s.

9. The encoder of claim 1, wherein for an offset matrix that is vertically offset from matrices corresponding to the wavelet domain data, the encoder determines half-pixel data including half pixel coefficients hxy(r,s), hyy(r,s), and hdy(r,s) using the following equations:

$$hxy(r,s)=(hxs-hds+hxr+hdr)/2;$$

$$hyy(r,s)=(h0's-hys-h0'r-hyr)/2; \text{ and}$$

$$hdy(r,s)=(hxs-hds-hxr-hdr)/2, \text{ wherein:}$$

r and s are indices identifying arrays that are vertically offset by one coefficient from the offset matrix;

hxr, hyr, and hdr are wavelet domain coefficients and h0'r is an approximate low frequency wavelet domain coefficient corresponding to r; and hxs, hys, and hds are wavelet domain coefficients and h0s is an approximate low frequency wavelet domain coefficient corresponding to s.

10. The encoder of claim 1, wherein for an offset matrix that is diagonally offset from matrices corresponding to the wavelet domain data, the encoder determines half-pixel data including half pixel coefficients hxy(r,s), hyy(r,s), and hdy(r,s) using the following equations:

$$d'=(h0'r+hxr+hyr+hdr)/2;$$

$$g'=(h0's-hxs+hys-hds)/2;$$

$$j'=(h0't+hxt-hyt-hdt)/2;$$

$$m'=(h0'u-hxu-hyu+hdu)/2;$$

$$hxd(r,u)=(m'-j'+g'-d')/4;$$

$$hyd(r,u)=(m'+j'-g'-d')/4; \text{ and}$$

$$hdd(r,u)=(m'-j'-g'+d')/4, \text{ wherein:}$$

r, s, t, and u are indices identifying arrays that are diagonally offset by one coefficient from the offset matrix;

hxr, hyr, and hdr are wavelet domain coefficients and h0'r is an approximate low frequency wavelet domain coefficient corresponding to r;

hxs, hys, and hds are wavelet domain coefficients and h0s is an approximate low frequency wavelet domain coefficient corresponding to s;

hxt, hyt, and hdt are wavelet domain coefficients and h0'r is an approximate low frequency wavelet domain coefficient corresponding to t; and hxu, hyu, and hdu are wavelet domain coefficients and h0s is an approximate low frequency wavelet domain coefficient corresponding to u.

11. An encoding process comprising:

performing a wavelet transformation on a first frame of video data to generate first wavelet domain data;

generating half-pixel data from the first wavelet domain data, wherein the half-pixel data approximates wavelet domain data resulting from a wavelet transform of matrices that are offset relative to matrices used during the wavelet transform;

searching wavelet domain data and the half-pixel data for a block that best matches an object block from second wavelet domain data representing a second frame; and including in a data stream representing the second frame a motion vector that identifies the block that best matches the object block.

12. The encoding process of claim 11, wherein generating half-pixel data from the first wavelet domain data is performed without performing an inverse wavelet transform.

13. The encoding process of claim 11, wherein:

the first wavelet domain data includes a plurality of levels including a top level and lower levels, each lower level including high frequency wavelet domain data, the top level including high frequency wavelet domain data and low frequency wavelet domain data; and generating half-pixel data from the first wavelet domain data comprises combining high frequency wavelet domain data from one of the lower levels with an approximation of low frequency for the lower level.

14. The encoding process of claim 13, wherein the approximation of low frequency for the lower level is derived from the low frequency wavelet domain data in the top level.

15. The encoding process of claim 11, wherein generating the half-pixel data comprises determining half pixel coefficients hxx(r,s), hyx(r,s), and hdx(r,s) for an offset matrix that is horizontally offset from matrices corresponding to the wavelet domain data, using the following equations:

$$hxx(r,s)=(h0's-hxs-h0'r-hxr)/2;$$

$$hyx(r,s)=(hys-hds+hyr+hxr)/2; \text{ and}$$

$$hdx(r,s)=(hys-hds-hyr-hdr)/2, \text{ wherein:}$$

r and s are indices identifying arrays that are horizontally offset by one coefficient from the offset matrix;

hxr, hyr, and hdr are wavelet domain coefficients and h0'r is an approximate low frequency wavelet domain coefficient corresponding to r; and hxs, hys, and hds are wavelet domain coefficients and h0s is an approximate low frequency wavelet domain coefficient corresponding to s.

16. The encoder of claim 11, wherein generating the half-pixel data comprises determining half pixel coefficients hxy(r,s), hyy(r,s), and hdy(r,s) for an offset matrix that is vertically offset from matrices corresponding to the wavelet domain data, using the following equations:

$hxy(r,s)=(hxs-hds+hxr+hdr)/2;$ $hyy(r,s)=(h0's-hys-h0'r-hyr)/2;$ and $hdy(r,s)=(hxs-hds-hxr-hdr)/2,$ wherein:

r and s are indices identifying arrays that are vertically offset by one coefficient from the offset matrix;

hxr, hyr, and hdr are wavelet domain coefficients and h0'r is an approximate low frequency wavelet domain coefficient corresponding to r; and hxs, hys, and hds are wavelet domain coefficients and h0s is an approximate low frequency wavelet domain coefficient corresponding to s.

17. The encoder of claim 11, wherein generating the half-pixel data comprises determining half pixel coefficients hxy(r,s), hyy(r,s), and hdy(r,s) for an offset matrix that is diagonally offset from matrices corresponding to the wavelet domain data, using the following equations:

$d'=(h0'r+hxr+hyr+hdr)/2;$ $g'=(h0's-hxs+hys-hds)/2;$ $j'=(h0't+hxt-hyt-hdt)/2;$ $m'=(h0'u-hxu-hyu+hdu)/2;$ $hxd(r,u)=(m'-j'+g'-d')/4;$ $hyd(r,u)=(m'+j'-g'-d')/4;$ and $hdd(r,u)=(m'-j'-g'+d')/4,$ wherein:

r, s, t, and u are indices identifying arrays that are diagonally offset by one coefficient from the offset matrix;

hxr, hyr, and hdr are wavelet domain coefficients and h0'r is an approximate low frequency wavelet domain coefficient corresponding to r;

hxs, hys, and hds are wavelet domain coefficients and h0s is an approximate low frequency wavelet domain coefficient corresponding to s;

hxt, hyt, and hdt are wavelet domain coefficients and h0'r is an approximate low frequency wavelet domain coefficient corresponding to t; and hxu, hyu, and hdu are wavelet domain coefficients and h0s is an approximate low frequency wavelet domain coefficient corresponding to u.

18. A video decoding process comprising:

decoding a data structure to extract a difference array and motion vectors associated with a first frame of video, the difference array containing a difference between wavelet domain data;

for each motion vector, identifying whether the motion vector is of a first type or a second type, wherein:

motion vectors of the first type identify respective blocks of wavelet domain data representing a second frame; and motion vectors of the second type identify respective blocks of data corresponding to an approximation of a wavelet transform of a matrix of pixel values representing a portion of the second frame, the matrix being offset relative to matrices used in generating the wavelet domain data representing the second frame;

adding the respective blocks of wavelet domain data identified by motion vectors of the first type to respective portions of the difference array; and for each motion vector of the second type, generating from the wavelet domain data representing the second frame the block of data identified by the motion vector of the second type, and adding the block thus generated to a portion of the difference array corresponding to the motion vector of the second type.

19. The method of claim 18, further comprising performing an inverse wavelet transform on an array that results from adding the blocks of wavelet domain data and generated data to the difference array.

20. The method of claim 18, wherein the blocks of data identified by the motion vectors of the second type are generated from the wavelet domain data for the second frame without performing an inverse wavelet transform on the wavelet domain data for the second frame.

21. The method of claim 18, wherein:

the wavelet domain data representing the second frame includes a plurality of levels including a top level and lower levels, each lower level including high frequency wavelet domain data, the top level including low frequency wavelet domain data; and generating the block of data identified by the motion vector of the second type comprises combining high frequency wavelet domain data from one of the lower levels with an approximation of low frequency for the lower level.

22. The method of claim 21, wherein the approximation of low frequency for the lower level is derived from the low frequency wavelet domain data in the top level.

23. A data structure representing video comprising:

first data indicating wavelet domain data for a first frame of the video;

second data indicating a difference array for a second frame of the video;

motion vectors of a first type, wherein the motion vectors of the first type correspond to respective blocks in the difference array and identify blocks of the wavelet domain data for addition to the respective blocks in the difference array when generating wavelet domain data for the second frame; and motion vectors of a second type, wherein the motion vectors of the second type correspond to respective blocks in the difference array and identify blocks of half-pixel data for addition to the respective blocks in the difference array when generating the wavelet domain data for the second frame, the half-pixel data approximating wavelet transforms of arrays from the first frame that are offset relative to arrays from the first frame that were used in generating the wavelet domain data for the first frame.

24. The data structure of claim 23, wherein the first data comprises:

data indicating a second difference array for the first frame of the video;

motion vectors of the first type that are associated with the first frame, wherein the motion vectors of the first type associated with the first frame correspond to respective blocks in the second difference array and identify blocks of wavelet domain data for a third frame for addition to the respective blocks in the second difference array when generating the wavelet domain data for the first frame; and motion vectors of the second type that are associated with the first frame, wherein the motion vectors of the second type that are associated with the first frame correspond to respective blocks in the second difference array and identify blocks of half-pixel data for addition to the respective blocks in the second difference array when generating the wavelet domain data for the first frame, the half-pixel data approximating wavelet transforms of arrays from the third frames that are offset relative to arrays from the third frame that were used in generating the wavelet domain data for the third frame.

* * * * *